United States Patent
Kovac (10) Patent No.: US 9,475,136 B2
(45) Date of Patent: Oct. 25, 2016

(54) HIGH-SPEED MILLING CUTTER AND CUTTING INSERT THEREFOR

(71) Applicant: Kennametal Inc., Latrobe, PA (US)

(72) Inventor: Jeffrey Francis Kovac, Loyalhanna, PA (US)

(73) Assignee: KENNAMETAL INC., Latrobe, PA (US)

( * ) Notice: Subject to any disclaimer, the term of this patent is extended or adjusted under 35 U.S.C. 154(b) by 459 days.

(21) Appl. No.: 13/953,794

(22) Filed: Jul. 30, 2013

(65) Prior Publication Data

US 2015/0037106 A1  Feb. 5, 2015

(51) Int. Cl.
  *B23C 5/22* (2006.01)
  *B23C 5/10* (2006.01)
  *B23C 5/20* (2006.01)

(52) U.S. Cl.
  CPC ............. *B23C 5/207* (2013.01); *B23C 5/2221* (2013.01); *B23C 2200/0411* (2013.01); *B23C 2200/12* (2013.01); *B23C 2200/125* (2013.01); *B23C 2210/163* (2013.01); *B23C 2210/168* (2013.01); *B23C 2220/44* (2013.01); *Y10T 407/1906* (2015.01); *Y10T 407/23* (2015.01); *Y10T 407/235* (2015.01)

(58) Field of Classification Search
  CPC .......... B23C 2200/0411; B23C 5/207; B23C 5/2221; B23C 2200/12; B23C 2200/125; B23C 2210/163; B23C 2220/44; B23C 2210/168; Y10T 407/23; Y10T 407/24; Y10T 407/235
  USPC .............................. 407/113–15, 99, 101–105
  See application file for complete search history.

(56) References Cited

U.S. PATENT DOCUMENTS

| 4,529,339 A | * | 7/1985 | Shimomura | B23C 5/207 407/114 |
| 5,486,073 A | * | 1/1996 | Satran | B23C 5/109 407/113 |
| 5,593,255 A | * | 1/1997 | Satran | B23C 5/109 407/113 |
| 6,048,140 A | * | 4/2000 | Johnson | B23C 5/109 407/113 |
| 6,126,366 A | * | 10/2000 | Lundblad | B23B 27/1622 407/102 |

(Continued)

FOREIGN PATENT DOCUMENTS

| EP | 0104517 A2 | 4/1984 |
| EP | 1897643 A1 | 3/2008 |
| WO | 2006138120 A2 | 12/2006 |

OTHER PUBLICATIONS

"Dedicated Tooling Gets Down to Business", http://americanmachinist.com/cutting-tools/dedicated-tooling-gets-down-business, Aug. 1, 1999.

(Continued)

*Primary Examiner* — Sara Addisu
(74) *Attorney, Agent, or Firm* — Larry R. Meenan (57) ABSTRACT

An indexable cutting insert having a top surface, a bottom surface, and a plurality of side surfaces. A main cutting edge, a ramping cutting edge, a wiper cutting edge, and a nose radius cutting edge are formed at the intersection between the top surface and the side surfaces. Two diagonally side surfaces further comprise a first side surface and a second side surface. The second side surface extends the entire length of the main cutting edge. The first and second side surfaces and two other side surfaces contact an insert pocket of the milling cutter when the cutting insert is mounted the insert pocket of the high-speed milling cutter, thereby providing four-point contact between the cutting insert and the insert pocket.

14 Claims, 7 Drawing Sheets

(56) References Cited

U.S. PATENT DOCUMENTS

| | | | | |
|---|---|---|---|---|
| 6,152,658 | A * | 11/2000 | Satran | B23B 27/00 407/103 |
| 6,769,843 | B2 * | 8/2004 | Hansson | B23B 27/00 407/104 |
| 6,901,642 | B2 | 6/2005 | Rydberg | |
| 6,929,427 | B2 * | 8/2005 | Satran | B23C 5/109 407/113 |
| 7,004,689 | B2 | 2/2006 | DeRoche et al. | |
| 7,121,176 | B2 | 10/2006 | Pinger et al. | |
| 7,255,518 | B2 * | 8/2007 | Wallstrom | B23B 27/1662 407/101 |
| 7,422,395 | B2 * | 9/2008 | Huang | B23B 27/04 407/101 |
| 7,429,150 | B2 * | 9/2008 | Kovac | B23B 27/1662 407/103 |
| 7,794,182 | B2 * | 9/2010 | Lehto | B23C 5/1045 407/113 |
| 7,905,689 | B2 * | 3/2011 | Dufour | B23C 5/207 407/113 |
| 8,192,114 | B2 * | 6/2012 | Chang | B23B 27/1622 407/103 |
| 8,403,603 | B2 * | 3/2013 | Zitzlaff | B23B 27/1666 407/101 |
| 8,696,254 | B2 * | 4/2014 | Satran | B23C 5/109 407/113 |
| 8,845,243 | B2 * | 9/2014 | Hansson | B23B 27/1622 408/188 |
| 9,120,154 | B2 * | 9/2015 | Hecht | B23B 27/1622 |
| 2004/0071515 | A1 * | 4/2004 | Arvidsson | B12C 5/109 407/113 |
| 2006/0013661 | A1 * | 1/2006 | Long | B23B 27/1622 407/113 |
| 2007/0160431 | A1 * | 7/2007 | Pantzar | B23C 5/2213 407/67 |
| 2010/0124465 | A1 * | 5/2010 | Morrison | B23C 5/1045 407/42 |
| 2012/0207555 | A1 * | 8/2012 | Sjoo | B23F 21/166 407/114 |
| 2013/0330136 | A1 * | 12/2013 | Hecht | B23C 5/2221 407/113 |
| 2015/0336187 | A1 * | 11/2015 | Choi | B23C 5/06 407/48 |

OTHER PUBLICATIONS

"High-value Machining Efficiency", http://us.industrysourcing.com/articles/260146.aspx, Oct. 12, 2012.

\* cited by examiner

HIGH-SPEED MILLING CUTTER AND CUTTING INSERT THEREFOR

BACKGROUND OF THE INVENTION

1. Field of the Invention

This invention relates to a milling cutter and cutting insert for milling a metallic work piece, such as aluminum, and the like. More particularly, this invention relates to a high-speed milling cutter and an indexable cutting insert that includes a pair of angled sidewalls extending from the bottom surface that wedges the cutting insert against the radial seating wall of the insert pocket to minimize or eliminate movement of the cutting insert and the resulting bending moment and shear forces on the insert mounting screw.

2. Description of the Related Art

Milling cutters for performing machining operations on metallic work pieces are well known in the prior art. Such cutters typically comprise a cylindrical or disc-shaped body which is detachably connectable to a rotating drive shaft. A plurality of cutting inserts are mounted around the outer periphery of the cutter body for producing a series of metal-shaving cuts on a work piece. In operation, such milling cutters are typically rotated at speeds of several thousand rpm while a metal work piece is engaged with the inserts in the cutter body.

Recently, there has been an increased demand for milling cutters capable of operating at rotational speeds far in excess of several thousand rpm. The advantages associated with such high-speed milling include a faster cutting action which results in a higher metal removal rate on the work piece, a reduction in the cutting forces applied to the cutting inserts by the work piece, and a smoother final cut. Such reduced cutting forces protract the operating life of the inserts, not only reducing the costs associated with insert replacement, but also the amount of downtime necessary to reorient the cutting edges of indexable inserts. The cost and time of fixturing is also reduced because higher cutting forces require more elaborate and more rigid fixturing to achieve desired accuracy.

As a result of these advantages, a high-speed milling cutter not only lowers machining costs while increasing productivity, but also enhances the quality of the final machined work piece since the cutting action is smoother, and leaves a better finish. It will be appreciated that the substantial increase in rotational speed necessary to obtain all the aforementioned advantages also results in a substantial increase in the centrifugal forces generated in the body of the cutter. Generally speaking, the centrifugal force $F_c$ is dependent upon the mass (m) of the cutter body supporting the cutting insert, the length of the radius (r) of the cutter body, and the square of the angular velocity ($\Omega$) of the body. The relationship between these parameters may be expressed in the equation $F_c=(m\Omega^2)(r)$. The fact that the centrifugal force (and hence tensile stress) on the cutter body increases with the square of the angular velocity has, up to now, posed a substantial obstacle in the development of a milling cutter capable of operating at speeds higher than several thousand rpm. A milling cutter rotating at 10,000 rpm would have 25 times more centrifugally induced tensile stress along its periphery than when it was operated at 2,000 rpm. If the same cutter is spun at 20,000 rpm, it would have over 100 times more centrifugally induced tensile stress.

In addition, the substantial increase in rotational speed necessary to obtain all the aforementioned advantages also results in a substantial increase in the centrifugal forces generated on the inserts of the cutter. Specifically, the centrifugal forces tend to cause the inserts to become unseated from the insert pocket during high-speed milling operations. Thus, there is a need for a high-speed milling cutter capable of operating at high speeds, for example, about 20,000 rpm that securely and positively retains the cutting inserts within the insert pockets of the cutter body. Ideally, such a high-speed milling cutter and cutting inserts should be relatively inexpensive to manufacture, and should utilize inexpensive, readily replaceable cutting inserts so as to minimize both the cost of fabrication and operation of the device.

Finally, the art of machining materials such as aluminum teaches that the trend is for incorporation of vacuum systems to rid the work area of cut material (chips) in the immediate vicinity of the tool. These systems are quick to clog if the shape and/or size of the chips are not controlled to manageable levels. Thus, the successful tool will be one whose insert topography generates the controlled chip.

SUMMARY OF THE INVENTION

The inventors of the present invention have recognized these and other problems associated with high-speed milling cutters and associated cutting inserts. Briefly, according to this invention, the problem of adequately securing the cutting insert in the milling cutter pocket during high-speed milling operations is solved by providing a pair of angled side surfaces extending from the bottom surface of the cutting insert that contact corresponding angled radial support surfaces extending from the bottom surface of the insert pocket, thereby providing four-point contact between the cutting insert and the insert pocket.

In one aspect, an indexable cutting insert for a high-speed milling cutter comprises a top surface having a substantially planar central portion, a substantially planar bottom surface, and a plurality of side surfaces; wherein at least two of the side surfaces are diagonally opposite each other; a main cutting edge formed at an intersection between the top surface and the two diagonally opposite side surfaces; a ramping cutting edge formed at an intersection between the top surface and a different one of the side surfaces; a wiper cutting edge formed at the intersection between the top surface and a different one of the side surfaces; and a nose radius cutting edge formed at the intersection between the top surface and two of the plurality of the side surfaces, wherein the two diagonally side surfaces further comprise a first side surface and a second side surface, the second side surface extending an entire length of the main cutting edge, and wherein the first side surface is formed at an angle with respect to the substantially planar bottom surface, and wherein the second side surface is formed at an angle with respect to the substantially planar bottom surface, and wherein at least of the two side surfaces different than the two side surfaces diagonally opposite each other contact an insert pocket, and wherein the first and second side surfaces of the two diagonally opposite side surfaces contact the insert pocket, thereby providing four-point contact between the cutting insert and the insert pocket when the cutting insert is mounted the insert pocket of the high-speed milling cutter.

In another aspect of the invention, a combination high-speed milling cutter and cutting insert comprises a high-speed milling cutter comprising an insert pocket including a bottom surface, a radial support wall, an axial support wall, and a pair of support walls extending from the bottom surface, the support walls formed at an angle with respect to the bottom surface; and a cutting insert mounted in the insert pocket, the cutting insert comprising a top surface having a substantially planar central portion, a substantially planar bottom surface, and a plurality of side surfaces; wherein at least two of the side surfaces are diagonally opposite each other; a main cutting edge formed at an intersection between the top surface and the two diagonally opposite side surfaces; a ramping cutting edge formed at an intersection between the top surface and a different one of the side surfaces; a wiper cutting edge formed at the intersection between the top surface and a different one of the side surfaces; and a nose radius cutting edge formed at the intersection between the top surface and two of the plurality of the side surfaces, wherein the two diagonally side surfaces further comprise a first side surface and a second side surface, the second side surface extending an entire length of the main cutting edge, and wherein the first side surface is formed at an angle with respect to the substantially planar bottom surface, and wherein the second side surface is formed at an angle with respect to the substantially planar bottom surface, and wherein at least of the two side surfaces different than the two side surfaces diagonally opposite each other contact an insert pocket, and wherein the first and second side surfaces of the two diagonally opposite side surfaces contact the insert pocket, thereby providing four-point contact between the cutting insert and the insert pocket when the cutting insert is mounted the insert pocket of the high-speed milling cutter.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Referring to FIGS. 1-6, wherein like reference characters represent like elements, an indexable cutting insert 10 includes generally, a top surface 12, a substantially planar bottom surface 14 and six (6) side surfaces 16, 18, 20, 22, 24, 26. The insert 10 is generally diamond in shape in which the side surfaces 16, 22 are diagonally opposite each other, the side surfaces 18, 24 are diagonally opposite each other, and the side surfaces 20, 26 are diagonally opposite each other. The insert 10 is preferably made from cemented carbide or other materials known to those skilled in the art for milling a metallic work piece (not shown), such as aluminum, or the like.

The side surface 16 is further comprised of a first side surface 16a, and a second side surface 16b that are angled with respect to each other. Specifically, the first side surface 16a forms an angle 17 that is less than ninety (90) degrees with respect to the bottom surface 14. For example, the angle 17 can be in the range between about seventy (70) to about eighty (80) degrees with respect to the bottom surface 14. In one embodiment, the angle 17 is about seventy-five (75) degrees. In addition, the second side surface 16b forms an angle 19 with respect to the bottom surface 14. For example, the angle 19 can be in the range between about twenty (20) to about fifty (50) degrees with respect to the bottom surface 14. In one embodiment, the angle 17 is about thirty (30) degrees. In general, a larger magnitude of the angle 19 is preferred. In all embodiments, the angle 17 is larger than the angle 19 (i.e., the angle 19 is smaller than the angle 17). In other words, the first side surface 16a and the second side surface 16b form an included angle 21 of greater than ninety (90) degrees.

Figure 5:
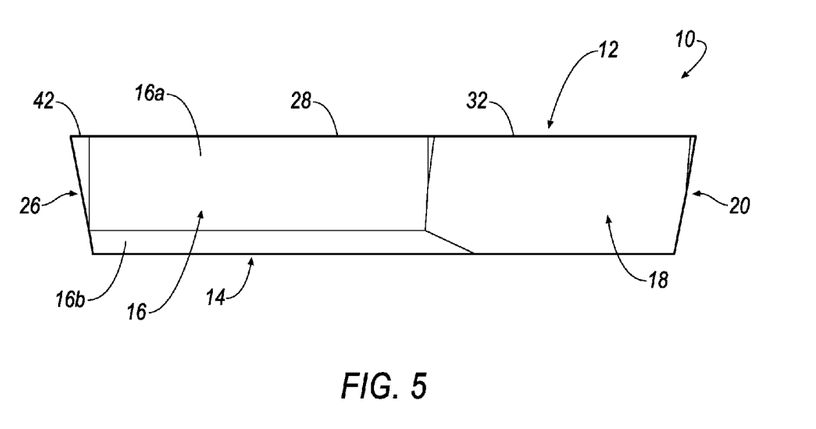
FIG. 5 shows a front view of the cutting insert of FIG. 1.
Figure 6:
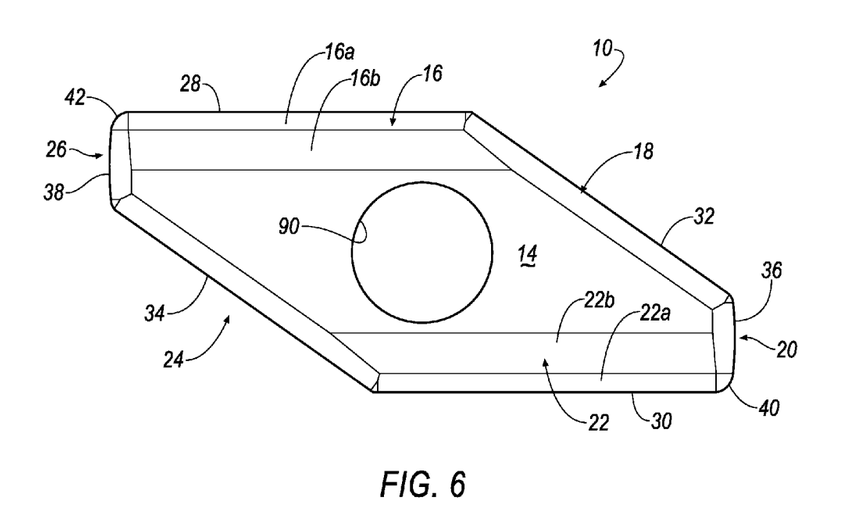
FIG. 6 shows a bottom view of the cutting insert of FIG. 1.

Similarly, the side surface 22 is further comprised of a first side surface 22a and a second side surface 22b that are also angled with respect to each other. Specifically, the first side surface 22a forms an angle 23 that is less than ninety (90) degrees with respect to the bottom surface 14. For example, the angle 23 can be in the range between about seventy (70) to about eighty (80) degrees with respect to the bottom surface 14. In one embodiment, the angle 23 is about seventy-five (75) degrees. In addition, the second side surface 22b forms an angle 25 with respect to the bottom surface 14. For example, the angle 25 can be in the range between about twenty (20) to about fifty (50) degrees with respect to the bottom surface 14. In one embodiment, the angle 25 is equal to the angle 19 and is about thirty (30) degrees. The angles 19, 25 can be different than one another, but the cutting insert 10 would no longer be indexable. In general, a larger magnitude of the angle 25 is preferred. In all embodiments, the angle 23 is larger than the angle 25 (i.e., the angle 25 is smaller than the angle 23). In other words, the first side surface 22a and the second side surface 22b form an included angle 27 of greater than ninety (90) degrees. As can be seen in FIGS. 5 and 6, the second side surfaces 16b, 22b extend from the bottom surface 14 the entire length of the main cutting edges 28, 30.

Main cutting edges 28, 30 are formed at the intersection between the top surface 12 and the side surfaces 16, 22, respectively. Ramping cutting edges 32, 34 are formed at the intersection between the top surface 12 and the side surfaces 18, 24, respectively. Wiper cutting edges 36, 38 are formed at the intersection between the top surface 12 and the side surface 20, 26, respectively. A nose radius cutting edge 40 is formed at the intersections between the top surface 12 and the side surfaces 20 and 22, and a nose radius cutting edge 42 is formed at the intersections between the top surface 12 and the side surfaces 16 and 26. A radiused corner 44 is formed between the side surfaces 16, 18, a radiused corner 46 is formed between the side surfaces 18, 20, a radiused corner 48 is formed between the side surfaces 22, 24, and a radiused corner 50 is formed between the side surfaces 24, 26.

Figure 3:
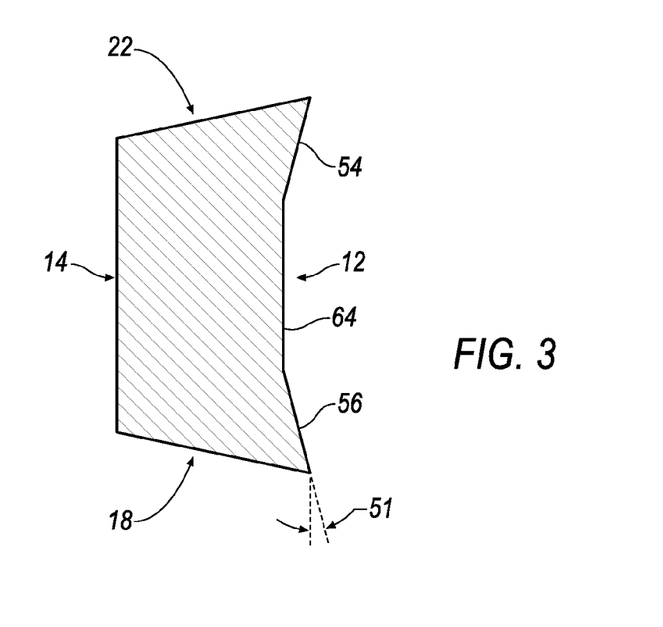
FIG. 3 shows a cross-sectional view of the cutting insert taken along line 3-3 of FIG. 2.
Figure 4:
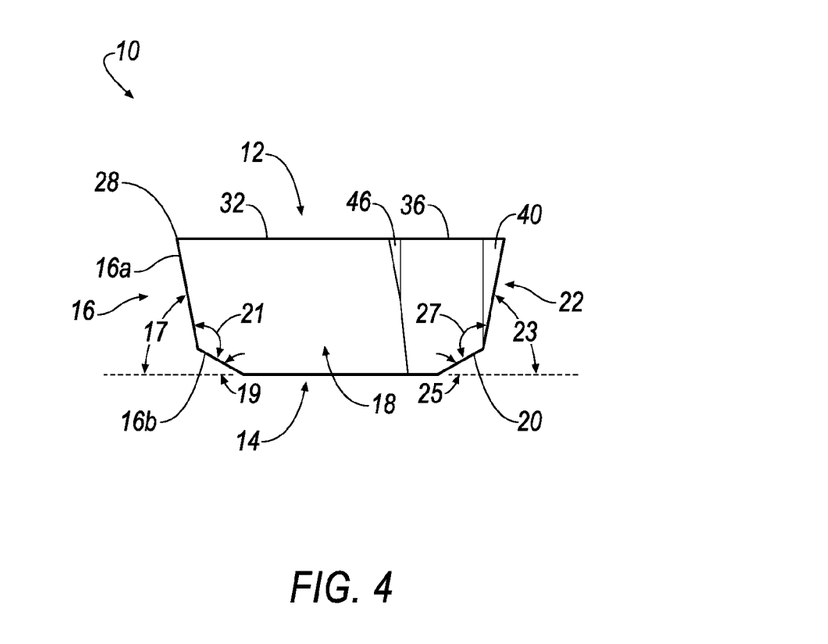
FIG. 4 shows an end view of the cutting insert of FIG. 1.

The top surface 12 of the cutting insert 10 includes a rake face 52 extending from the main cutting edge 28, a rake face 54 extending from the main cutting edge 30, a rake face 56 extending from the ramping cutting edge 32, a rake face 58 extending from the ramping cutting edge 34, a rake face 60 extending from the wiper cutting edge 36 and a rake face 62 extending from the wiper cutting edge 38. The rake faces 52, 54, 56, 58, 60, 62 slope upwardly at an angle 51 in a range between about ten (10) degrees to about twenty-five (25) degrees with respect to the bottom surface 14 such that all the cutting edges lie in the same plane, as shown in FIG. 3. In one embodiment, the angle 51 is about fifteen (15) degrees. The rake faces 52, 54, 56, 58, 60, 62 are used to effectively evacuate chips formed during milling operations with regard to the top surface 12. The top surface 12 of the cutting insert 10 also includes a substantially planar central portion 64 that is generally parallel to the substantially planar bottom surface 14. Thus, the rake faces 52, 54, 56, 58, 60, 62 slope upwardly at an angle 51 in a range between about ten (10) degrees to about twenty-five (25) degrees with respect to the central plateau 64 such that all the cutting edges lie in the same plane.

The top surface 12 further includes a plurality of radius blends that provide a transition for the topography of the top surface 12 between the central portion 64 and the plurality of rake faces of the cutting insert 10. For example, the radius blends may be slightly concave in cross section to provide a transition between the substantially planar topography of the central portion 64 and the rake faces that slope upwardly at an angle 51 with to its respective cutting edge. Specifically, radius blends 66, 68 are located between the central portion 64 and the rake faces 52, 54 that slope upwardly to the main cutting edges 28, 30, respectively. Radius blends 70, 72 are located between the central portion 64 and the rake faces 56, 58 that slope upwardly to the ramping cutting edges 32, 34, respectively. Very small radius blends 74, 76 are located between the central portion 64 and the rake faces 60, 62 that slope upwardly to the wiper cutting edges 36, 38, respectively.

In addition, radius blends are provided between the plurality of rake faces of the cutting insert 10. Specifically, a radius blend 78 is located between the rake faces 52, 56, a radius blend 80 is located between the rake faces 56, 60, a radius blend 82 is located between the rake faces 54, 60, a radius blend 84 is located between the rake faces 54, 58, a radius blend 86 is located between the rake faces 58, 62, and a radius blend 88 is located between the rake faces 52, 62, as shown in FIG. 2.

It will be appreciated that the invention is not limited by the amount that the rake faces slope upwardly from its respective blend radius to its respective cutting edge, and that the invention can be practiced with any desirable amount of angle to provide improved chip formation and strength. Thus, the topography of the top surface 12 of the cutting insert 10 of the invention is such that the central portion 64 is substantially planar and lowest in elevation that gradually slopes upward to the cutting edges 28, 30, 32, 34, 36, 38.

Figure 1:
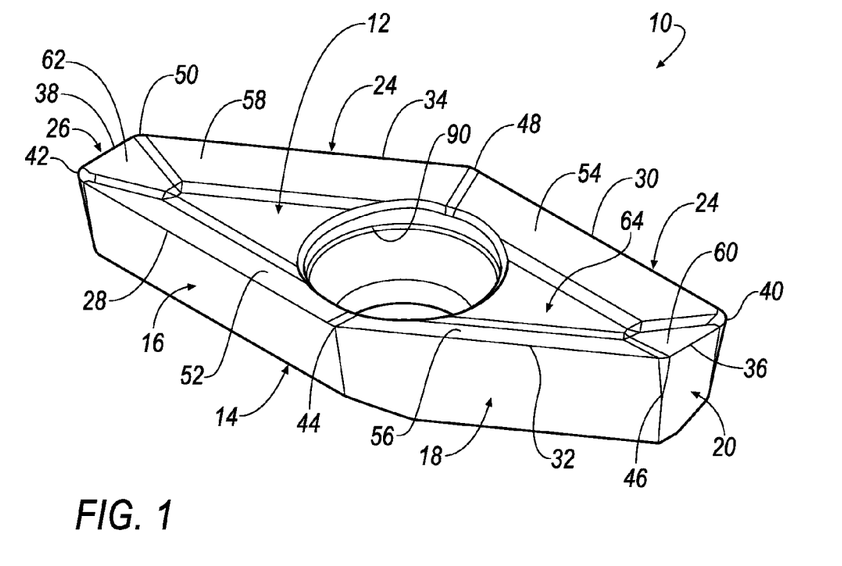
FIG. 1 shows a perspective view of an indexable cutting insert according to an embodiment of the invention.
Figure 2:
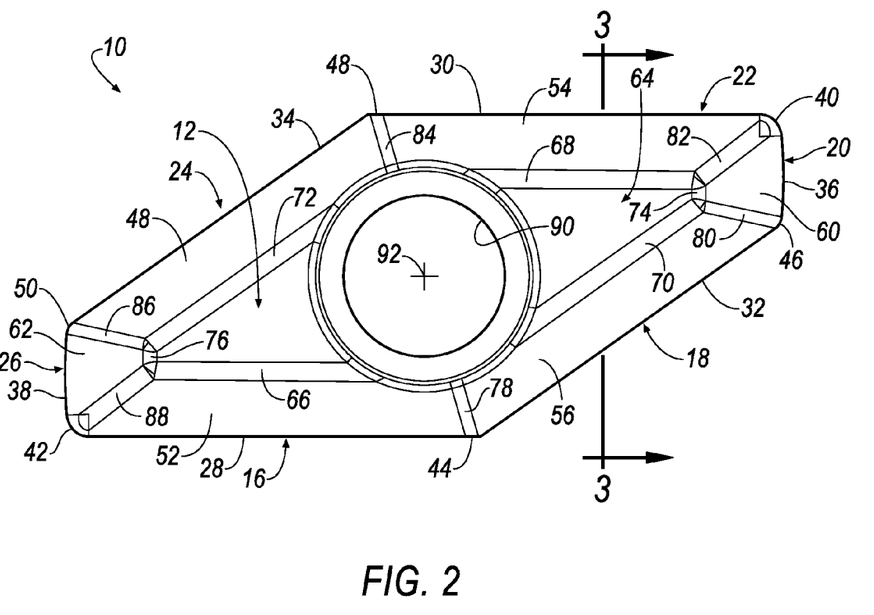
FIG. 2 shows a top view of the cutting insert of FIG. 1.

Referring to FIGS. 1, 2 and 6, to facilitate insertion and removal of the cutting insert 10 in an insert pocket described below, a countersunk bore 90 is provided extending from the top surface 12 to the bottom surface 14 of the cutting insert 10, and preferably located in the central portion 64 of the top surface 12 of the cutting insert 10.

As illustrated in FIGS. 1-6, the cutting insert 10 preferably, but not necessarily, includes the above-described cutting edges, rake faces, radius blends and other features at diagonally opposite corners. Thus, the cutting insert 10 is indexable and is mirror symmetric along a line passing through a central axis 92 and the main cutting edges 28, 30, or a line passing through the central axis 92 and the ramping cutting edges 32, 34, or a line passing through the central axis 92 and the wiper cutting edges 36, 38. This mirror symmetry of the cutting insert 10 permits the cutting insert 10 to be indexed twice by rotating the cutting insert approximately 180 degrees about the central axis 92 before disposal.

Referring now to FIGS. 7-10, a milling cutter 100 for use with the cutting insert 10 is shown according to an embodiment of the invention. In general, the milling cutter 100 includes a shank 102, a front portion 104 and a transition surface 106 between the shank 102 and the front portion 104. The cutter 100 is preferably made from heat-treated steel, such as H13 tool steel, or other materials known to those skilled in the art. The specific material used will vary as a consequence of desired design characteristics of the cutter 100. The cutter 100 is rotated about a rotational axis 108. The cutter 100 also includes an insert pocket, shown generally at 110, formed in the front portion 104 at the leading end of the cutter 100. When mounted in the insert pocket 110 of the milling cutter 100, the cutting insert 10 provides an effectively positive radial rake angle of between about five (5) degrees and about thirty-five (35).

Figure 9:
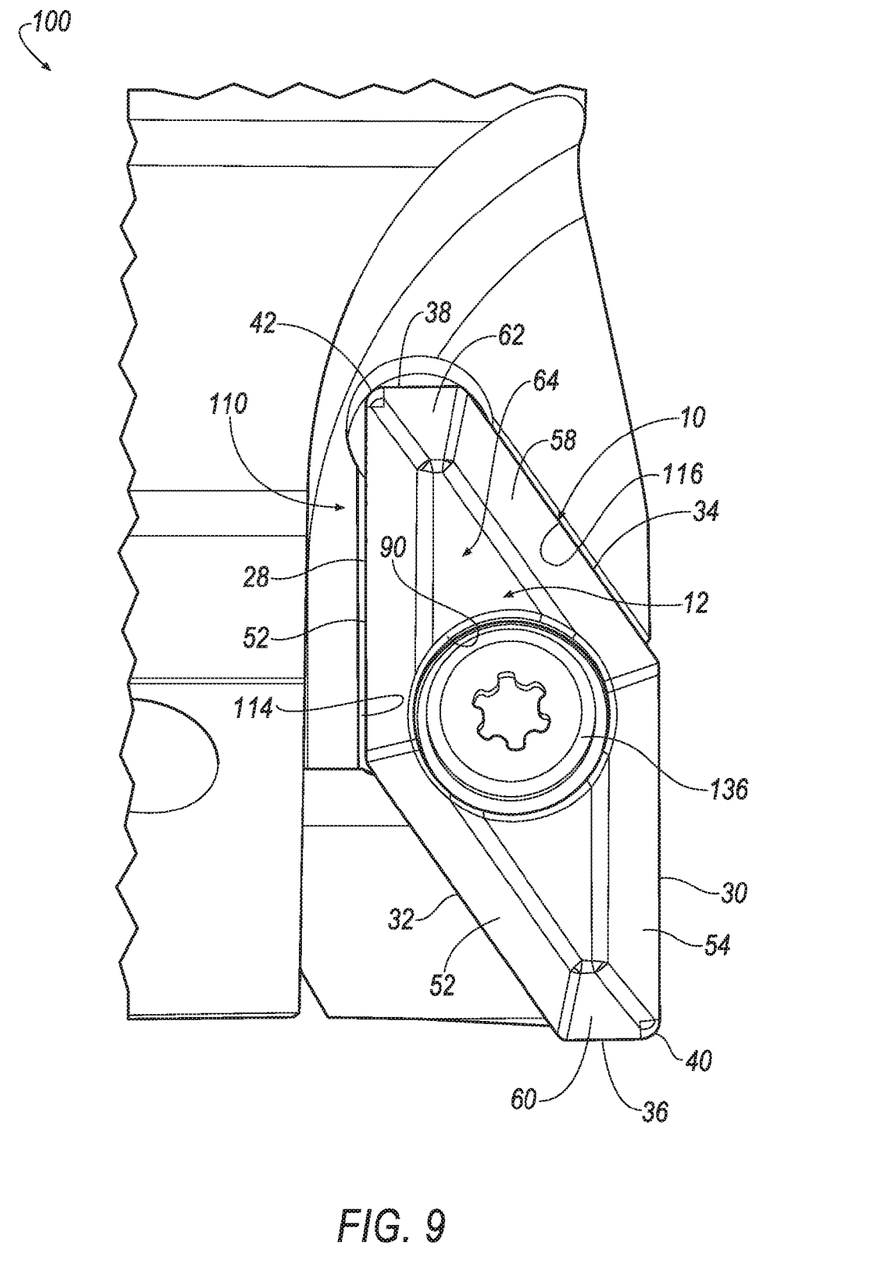
FIG. 9 shows an enlarged view of the insert pocket of the high-speed milling cutter of FIG. 7.
Figure 10:
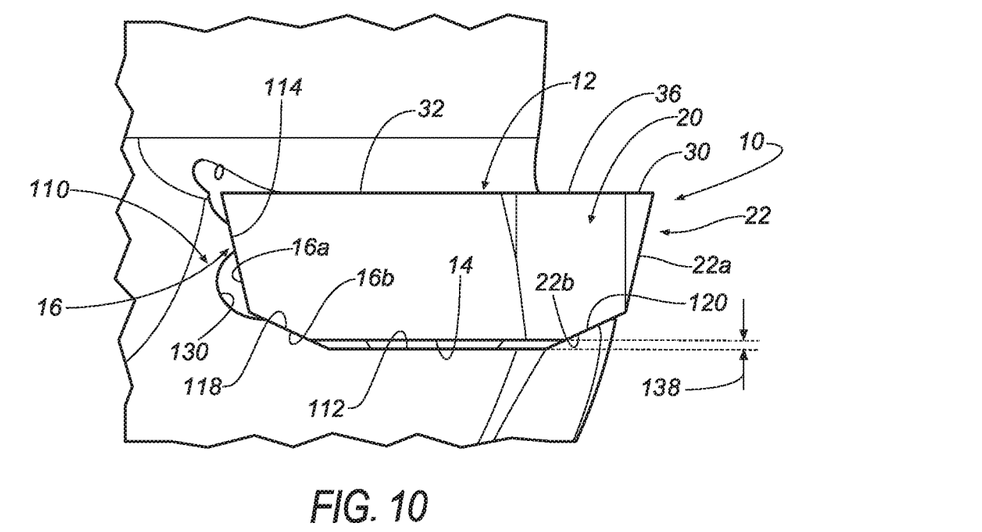
FIG. 10 shows and enlarged view of the insert pocket of the high-speed milling cutter with the cutting insert mounted therein.
Figure 11:
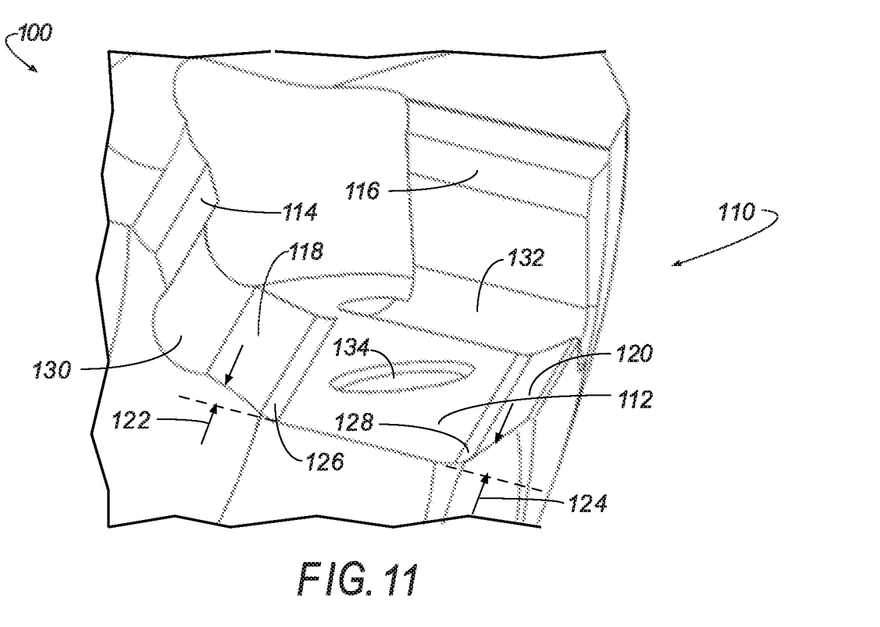
FIG. 11 shows an enlarged view of the insert pocket of the high-speed milling cutter of FIG. 7.

As shown in FIGS. 9-11, the insert pocket 110 includes a bottom surface 112, a radial support wall 114 and an axial support wall 116. The insert pocket 110 also includes a pair of support walls 118, 120 extending from the bottom surface 112. The support walls 118, 120 are formed at an angle 122, 124 with respect to the bottom surface 112, respectively. The angles 122, 124 are approximately equal to the angles 19, 25 formed between the second sides surfaces 16b, 22b and the bottom surface 14 of the cutting insert 10. For example, the angles 122, 124 can be in the range between about twenty (20) to about fifty (50) degrees with respect to the bottom surface 112. In general, a larger magnitude of the angles 122, 124 is preferred. In one embodiment, the angle 122 is equal to the angle 124 and is about thirty (30) degrees. However, the angles 122, 124 can be different than one another, but the cutting insert 10 would no longer be indexable. The insert pocket 110 may include a radius blend 126 between the bottom surface 112 and the support wall 118 and a radius blend 128 between the bottom surface 112 and the support wall 120. In addition, the insert pocket 110 may include a corner relief 130 between the radial support wall 114 and the support wall 118 and a corner relief 132 between the bottom surface 112 and the axial support wall 116. The bottom surface 112 of the insert pocket 110 also includes a threaded bore 134 for receiving a mounting screw 136.

Figure 7:
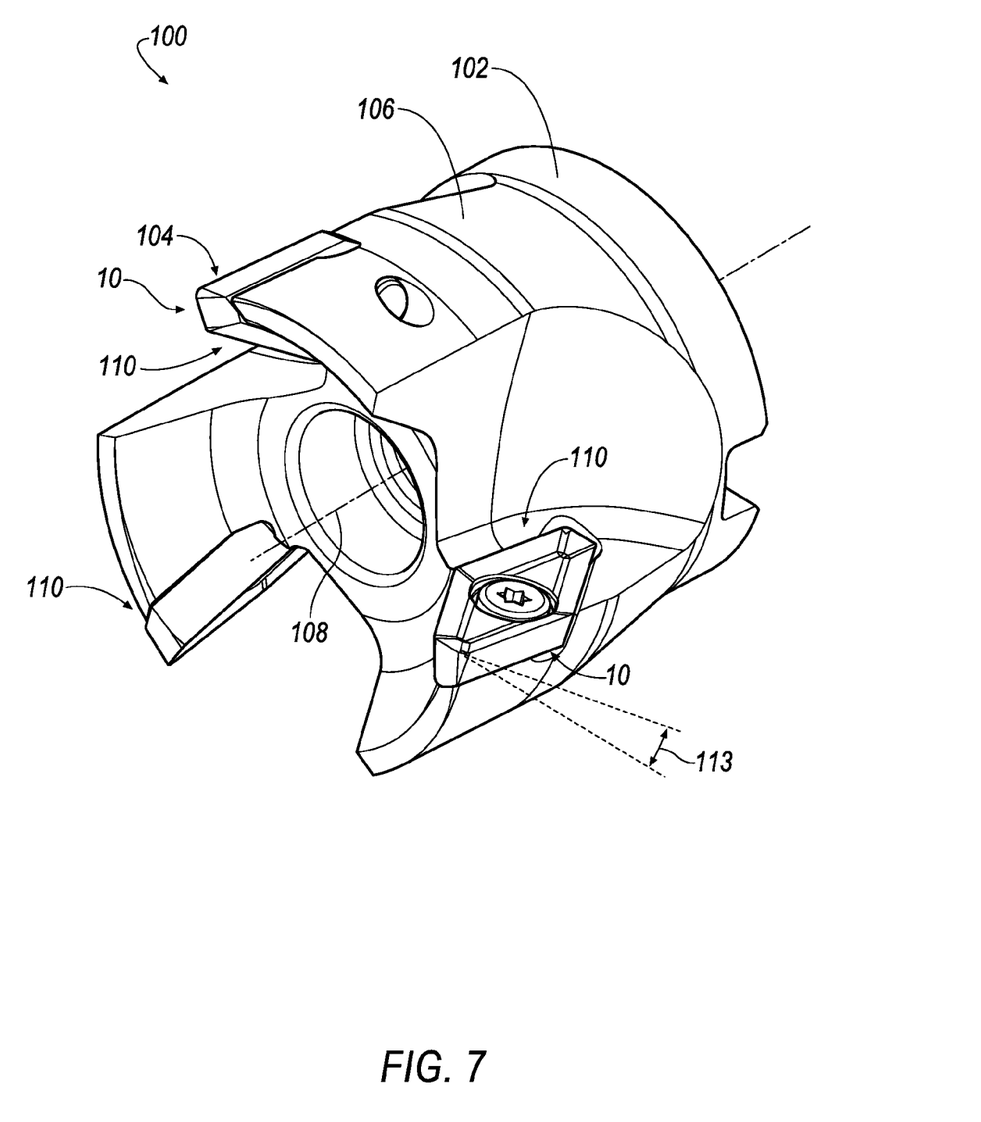
FIG. 7 shows a perspective view of a high-speed milling cutter according to an embodiment of the invention.
Figure 8:
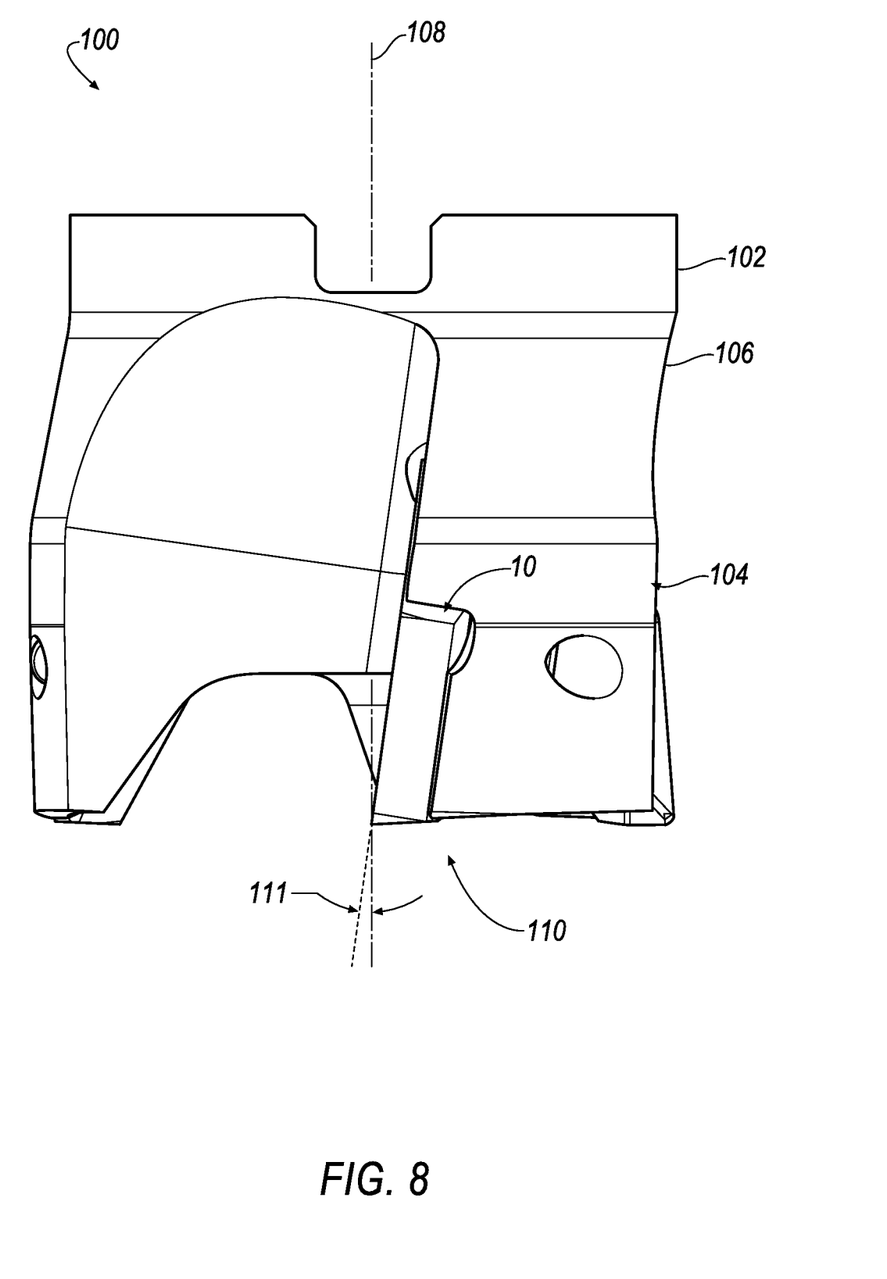
FIG. 8 shows a side view of the high-speed milling cutter of FIG. 7.

In the illustrated embodiment of the milling cutter 100 shown in FIGS. 7 and 8, the milling cutter 100 is capable of mounting three cutting inserts 10 oriented about 120 degrees with respect to each other within a respective insert pocket 110. However, it will be appreciated that the milling cutter of the invention is not limited by the number of cutting inserts 10 that can be mounted in the insert pockets 110, and that the invention can be practiced with any desired number of cutting inserts limited by only the physical limitations of the material properties of the milling cutter. For example, the milling cutter can be designed for mounting a fewer number of cutting inserts 10, or a greater number of cutting inserts 10 within a respective insert pocket 110. As seen in FIGS. 7 and 8, the cutting insert 10 is mounted in the insert pocket 110 at an axial rake angle 111 of between approximately five (5) and eighteen (18) degrees, and a radial rake angle 113 of between plus ten (10) and minus ten (10) degrees, based on cutter diameter.

As seen in FIG. 10, the second side surfaces 16b, 22b of the cutting insert 10 contact the support walls 118, 120, respectively, when the cutting insert 10 is mounted in the insert pocket 110. In addition, the first side surface 16a of the side surface 16 of the cutting insert 10 contacts the radial support surface 114 and the side surface 24 of the cutting insert 10 contacts the axial support surface 116 when the cutting insert 10 is mounted in the insert pocket 110 (not visible in FIG. 10). It is noted that the bottom surface 14 of the cutting insert 10 does not contact the bottom surface 112 of the insert pocket when the cutting insert 10 is mounted in the insert pocket 112. Thus, there is a gap 138 between the bottom surface 14 of the cutting insert 10 and the bottom surface 112 of the insert pocket when the cutting insert 10 is mounted in the insert pocket 112.

As described above, there is four-point contact between the cutting insert 10 and the insert pocket 112, thereby providing superior retention of the cutting insert 10 in the insert pocket 112 and allowing maximum RPM of the milling cutter 100 during high-speed milling cutting operations. In addition, the diamond-shaped cutting insert 10 and the milling cutter 100 allow for high ramping angles that are sometimes required in the manufacture of aluminum components.

The documents, patents and patent applications referred to herein are hereby incorporated by reference.

While the invention has been specifically described in connection with various embodiments thereof, it is to be understood that this is by way of illustration and not of limitation, and the scope of the appended claims should be construed as broadly as the prior art will permit.

What is claimed is:

1. An indexable cutting insert for a high-speed milling cutter, comprising:
   a top surface having a substantially planar central portion, a substantially planar bottom surface, a first pair of side surfaces (16, 22) diagonally opposite each other, a second pair of side surfaces (18, 24) diagonally opposite each other, and a third pair of side surfaces (20, 26) diagonally opposite each other;
   a main cutting edge formed at an intersection between the top surface and the first pair of side surfaces (16, 22);
   a ramping cutting edge formed at an intersection between the top surface and the second pair of side surfaces (18, 24);
   a wiper cutting edge formed at the intersection between the top surface and the third pair of side surfaces (20, 26); and
   a nose radius cutting edge formed at the intersection between the top surface and the first and third pair of side surfaces (16, 22, 20, 26),
   wherein the first pair of side surfaces (16, 22) further comprise a first side surface (16a, 22a) and a second side surface (16b, 22b), and
   wherein the first side surface (16a, 22a) of the first pair of sides surfaces (16, 22) is formed at a first angle with respect to the substantially planar bottom surface, and
   wherein the second side surface (16b, 22b) of the first pair of side surfaces (16, 22) is formed at a second, different angle with respect to the substantially planar bottom surface, and
   wherein the second side surfaces (16b and 22b) of each of the first pair of side surfaces (16, 22), the first side surface (16a or 22a) of one of the first and second side surfaces (16 or 22), and one side surface (18 or 24) of the second pair of side surfaces (18, 24) provide four-point contact between the cutting insert and an insert pocket when the cutting insert is mounted the insert pocket of the high-speed milling cutter.

2. The cutting insert of claim 1, wherein the first angle formed by the first side surface is greater than the second angle formed by the second side surface.

3. The cutting insert of claim 1, wherein the first and second angles can be in the range between about twenty to about fifty degrees with respect to the bottom surface.

4. The cutting insert of claim 1, wherein the top surface includes a rake face extending from the main cutting edge, a rake face extending from the ramping cutting edge, and a rake face extending from the wiper cutting edge.

5. The cutting insert of claim 4, wherein the rake faces slope upwardly at an angle in a range between about ten degrees to about twenty-five degrees with respect to the substantially planar bottom surface such that all the cutting edges lie in the same plane.

6. The cutting insert of claim 4, wherein the top surface includes radius blends between the central portion and the rake faces.

7. The cutting insert of claim 4, wherein the top surface includes radius blends between the rake faces.

8. The cutting insert of claim 4, wherein the top surface of the insert is parallel to the substantially planar bottom surface.

9. A high-speed milling cutter, comprising:
   an insert pocket including a bottom surface, a radial support wall, an axial support wall, and a pair of support walls extending from the bottom surface, the pair of support walls formed at an angle with respect to the bottom surface; and
   a cutting insert as recited in claim 1 mounted in the insert pocket.

10. The high-speed milling cutter of claim 9, further comprising a radius blend between the support walls and the bottom surface.

11. The cutting insert according to claim 1, wherein both the first and second side surfaces extend an entire length of the main cutting edge.

12. A combination high-speed milling cutter and cutting insert, the combination comprising:
   a high-speed milling cutter comprising:
      an insert pocket including a bottom surface (112), a radial support wall (114), an axial support wall (116), and a pair of support walls (118, 120) extending from the bottom surface, the pair of support walls (118, 120) formed at an angle with respect to the bottom surface (112); and
   a cutting insert mounted in the insert pocket, the cutting insert comprising:
      a top surface having a substantially planar central portion, a substantially planar bottom surface, a first pair of side surfaces (16, 22) diagonally opposite each other, a second pair of side surfaces (18, 24) diagonally opposite each other, and a third pair of side surfaces (20, 26) diagonally opposite each other;
      a main cutting edge formed at an intersection between the top surface and the first pair of side surfaces (16, 22);
      a ramping cutting edge formed at an intersection between the top surface and the second pair of side surfaces (18, 24);
      a wiper cutting edge formed at the intersection between the top surface and the third pair of side surfaces (20, 26); and
      a nose radius cutting edge formed at the intersection between the top surface and the first and third pair of side surfaces (16, 22, 20, 26), wherein the first pair of side surfaces (16, 22) further comprise a first side surface (16*a*, 22*a*) and a second side surface (16*b*, 22*b*), and wherein the first side surface (16*a*, 22*a*) of the first pair of sides surfaces (16, 22) is formed at a first angle with respect to the substantially planar bottom surface, and wherein the second side surface (16*b*, 22*b*) of the first pair of sides surfaces (16, 22) is formed at a second, different angle with respect to the substantially planar bottom surface, and wherein the second side surfaces (16*b* and 22*b*) of each of the first pair of side surfaces (16, 22), the first side surface (16*a* or 22*a*) of one of the first and second side surfaces (16 or 22), and one side surface (18 or 24) of the second pair of side surfaces (18, 24) contact the insert pocket of the milling cutter, thereby providing four-point contact between the cutting insert and the insert pocket when the cutting insert is mounted the insert pocket of the high-speed milling cutter.

13. The combination high-speed milling cutter and cutting insert according to claim 12, wherein both the first and second side surfaces extend an entire length of the main cutting edge.

14. The combination high-speed milling cutter and cutting insert according to claim 12, wherein the angle formed by the pair of supports walls of the insert pocket with respect to the bottom surface of the insert pocket is substantially equal to the second, different angle formed by the second side surface of the first pair of sides surfaces with respect to the substantially planar bottom surface of the cutting insert.

* * * * *